(12) United States Patent
Hutter et al.

(10) Patent No.: US 11,973,298 B2
(45) Date of Patent: Apr. 30, 2024

(54) PROTECTION APPARATUS AND TRAVEL ADAPTER

(71) Applicant: WORLDCONNECT AG, Widnau (CH)

(72) Inventors: Christoph Hutter, Diepoldsau (CH); Heiko Hutter, Diepoldsau (CH)

(73) Assignee: WORLDCONNECT AG, Widnau (CH)

( * ) Notice: Subject to any disclaimer, the term of this patent is extended or adjusted under 35 U.S.C. 154(b) by 547 days.

(21) Appl. No.: 17/281,211

(22) PCT Filed: Sep. 25, 2019

(86) PCT No.: PCT/IB2019/058119
§ 371 (c)(1),
(2) Date: Jan. 28, 2022

(87) PCT Pub. No.: WO2020/065545
PCT Pub. Date: Apr. 2, 2020

(65) Prior Publication Data
US 2022/0190529 A1    Jun. 16, 2022

(30) Foreign Application Priority Data
Sep. 27, 2018  (EP) .................................... 18197274

(51) Int. Cl.
*H01R 13/71*    (2006.01)
*H01R 13/688*   (2011.01)
(Continued)

(52) U.S. Cl.
CPC ....... *H01R 13/7137* (2013.01); *H01R 13/688* (2013.01); *H01R 31/065* (2013.01); *H01H 85/0241* (2013.01)

(58) Field of Classification Search
CPC .............. H01R 13/7137; H01R 13/688; H01H 85/0241
See application file for complete search history.

(56) References Cited

U.S. PATENT DOCUMENTS

| 4,484,185 A * | 11/1984 | Graves ................. H01R 31/065 439/373 |
| 8,128,434 B1 * | 3/2012 | Gandolfi .............. H01R 31/065 439/620.31 |
| 9,843,145 B2 | 12/2017 | Beideman et al. |

FOREIGN PATENT DOCUMENTS

| CN | 101071914 A | 11/2007 |
| CN | 203300549 U | 11/2013 |

(Continued)

OTHER PUBLICATIONS

PCT International Search Report for PCT/IB2019/058119, dated Nov. 27, 2019, 6 pages.

(Continued)

*Primary Examiner* — Sherman Ng
(74) *Attorney, Agent, or Firm* — MORRISS O'BRYANT COMPAGNI CANNON, PLLC

(57) ABSTRACT

The present invention relates to a protection apparatus (100) for protecting an electrical circuit. The protection apparatus comprises a thermal protection device (10) for interrupting the electrical circuit at a specific temperature and also an insertion slot (20) for receiving a fuse (21) for interrupting the electrical circuit at a specific current intensity in the electrical circuit. The thermal protection device (10) and the insertion slot (20) are connected in series in the electrical circuit (40), wherein the insertion slot and the thermal protection device are arranged adjacently.

9 Claims, 2 Drawing Sheets

Figure 1:
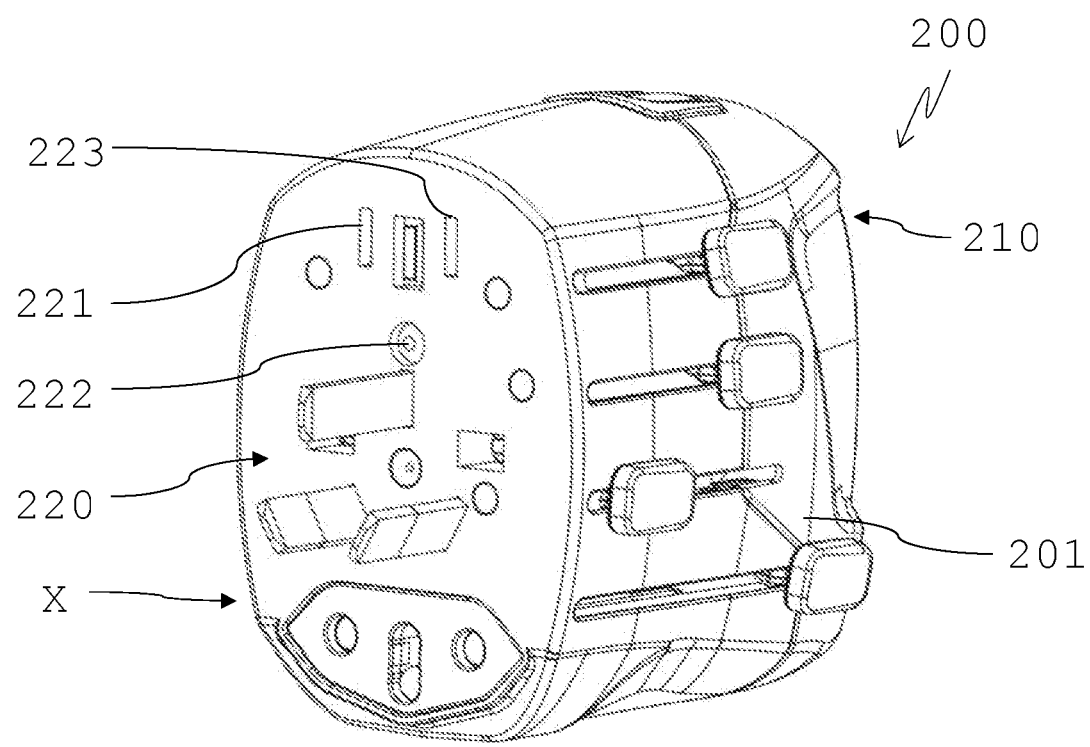

(51) Int. Cl.
    *H01R 13/713*     (2006.01)
    *H01R 31/06*     (2006.01)
    *H01H 85/02*     (2006.01)

(56) References Cited

FOREIGN PATENT DOCUMENTS

| | | |
|---|---|---|
| CN | 206283054 U | 6/2017 |
| EP | 0328017 | 8/1989 |
| EP | 0616389 | 9/1994 |
| JP | 2002276951 | 9/2002 |
| JP | 2002276951 A | 9/2002 |
| WO | 2002063722 | 8/2002 |
| WO | 2009152629 | 12/2009 |
| WO | 2009152630 | 12/2009 |
| WO | 2011017669 | 2/2011 |
| WO | 2018083134 | 5/2018 |

OTHER PUBLICATIONS

PCT Written Opinion of the International Searching Authority for PCT/IB2019/058119, dated Nov. 27, 2019, 14 pages.

* cited by examiner

PROTECTION APPARATUS AND TRAVEL ADAPTER

The invention relates to a protection apparatus for protecting an electrical circuit and a travel adapter with a protection apparatus for protecting an electrical circuit. Many different forms of travel adapters are known from the related art. Travel adapters are apparatuses into which plugs of at least a first standard can be inserted, and the travel adapters themselves can be plugged into at least one outlet of a standard different from the plug that conforms to the first standard.

Thus, the travel adapters typically have a socket side for inserting the plug and a plug side for inserting the travel adapter into an outlet.

Accordingly, there are openings in the socket side for plug pins of a plug. The plug side has corresponding plug pins for plugging into an outlet.

During use, it is provided that an electrical circuit is formed between the openings and the plug pins.

Such an apparatus is known, for example, from EP 0 616 389 A2. EP 0 616 389 A2 describes a travel adapter in which the openings are connected directly to the plug pins. In other words, there is a closed circuit between the openings and the plug pins.

It may be provided that several arrangements of different plug pins are provided on the plug side of the travel adapter in order to enable the travel adapter to be used with several outlets which conform to different standards.

Such travel adapters have become known, for example, with WO 2009/152630 A1 and with WO 2009/152629 A1. These two documents disclose travel adapters with multiple plug pins of different standards, wherein the plug pins of the respective standard can be extended out of the travel adapter housing together. In such cases, it is provided that the circuit between the openings on the socket side and the respective plug pins on the plug side only closes when the respective plug pins are in an end position that is suitable for operation. In this situation, therefore, when the travel adapter is in an inactive state the circuit is open, and it is only closed when the travel adapter is in an active state. Here and in the following text, all references to a circuit are understood to apply to a circuit in either the open or the closed state.

A travel adapter with displaceably arranged plug pins is also known from WO 02/063722 A2. The travel adapter of WO 02/063722 A2 further has a fuse to protect the circuit in the event of overcurrent.

All of these travel adapters from the prior art are not suitable for use in continuous operation. Due to the small dimensions of the housing of the respective travel adapters and structural arrangements, they tend to become warm and possibly overheat. Under certain circumstances, this may pose a risk to the travel adapters and their surroundings. U.S. Pat. No. 9,843,145 B2 discloses a plug with a thermal protection device. The thermal protection device comprises a thermal fuse that connects a lead to the plug and a first contact pin in the plug by means of a bimetallic strip. The thermal protection device further includes a fuse which is arranged in series between the thermal protection device and the first contact pin of the plug, the fuse being permanently connected to the first contact pin and the thermal fuse in the plug. The disadvantage of this solution is that the fuse forms a connecting path between the first contact pin and the thermal fuse and is thus arranged fixedly in the plug.

The object of the present invention is therefore to overcome one or more disadvantages of the related art. In particular, it is intended to provide a protection apparatus device and/or a travel adapter with a corresponding protection apparatus which makes it possible to protect an electrical circuit from overheating.

The object is achieved with the apparatuses defined in the independent patent claims. Further variants are discernible from the dependent claims.

A protection apparatus according to the invention for protecting an electrical circuit, in particular an electrical circuit of a travel adapter, comprises a thermal protection device for interrupting the circuit at a specific temperature and an insertion slot for receiving a fuse designed to interrupt the circuit when a specific current is present in the circuit. The thermal protection device and the insertion slot are connected in series in the circuit, wherein the insertion slot and the thermal protection device are arranged adjacently.

Here and in the following text, thermal protection device is understood to mean a fuse which switches above a certain temperature. A bimetallic switch which bends at a certain temperature and accordingly breaks a circuit would be an example of such a thermal protection device.

The arrangement of an insertion slot for a fuse in series with a thermal protection device makes it possible not only to protect the circuit against overcurrent when the circuit is closed, but also to safeguard against excessive heat in the circuit. In other words, for example, if a circuit is loaded to almost its maximum permitted current intensity, it heats up. If this happens for a prolonged period of time, there is a danger that the circuit will heat up above permissible temperatures. This can be prevented by the series connection as proposed. If the temperature of the circuit rises to the nominal temperature of the thermal protection device, for example 60°, the thermal protection device reacts and interrupts the circuit. Due to the adjacent arrangement of the insertion slot and the thermal protection device, the heat which is radiated by the heating of the fuse, which is arranged in the insertion slot during operation according to the invention, has a direct influence on the thermal protection device. The thermal protection device thus monitors the temperature development of a fuse arranged in the insertion slot, so that faster and/or improved monitoring of the temperature development in the protection apparatus can be provided and overheating of the circuit can be prevented.

This makes it possible to interrupt the circuit before it reaches a critical temperature. Typically, the fuse in the circuit heats up faster than the other components in the circuit. In other words, the temperature development of the fuse is faster than the temperature development of the circuit. For example, a thermal protection device rated for 120° C. is suitable for monitoring a fuse with a rating of 10 amperes.

For the purposes of the present document, an insertion slot is understood to describe a device in which a fuse can be received and which holds it firmly and replaceably. The fuse may be disposed detachably and/or separably in the insertion slot. The insertion slot may have a first contact clip and a second contact clip, which hold the fuse securely at a first contact and a second contact, and by which the first contact clip and the second contact clip are electrically connected. In this way, an overcurrent protection is provided which is easy to maintain and thus reduces service costs.

In a preferred variant it may be provided that the thermal protection device can be reset.

A resettable thermal protection device enables the circuit to be used several times.

It may be provided that the thermal protection device is designed with an automatic reset.

The automatic reset makes it possible for the circuit to close again as soon as the temperature of the circuit is within the permissible range again.

Alternatively, however, it may be provided that the thermal fuse is designed with a manual reset.

This ensures that the circuit does not close again automatically, and a device connected to the circuit, for example, is not started automatically.

The protection apparatus is preferably designed in such manner that the insertion slot and the thermal protection device are arranged substantially parallel and adjacent to one another. Substantially parallel includes both entirely parallel configurations and configurations with an angular deviation from parallelism of up to 10°.

The parallel and adjacent arrangement of the thermal protection device to the insertion slot of a fuse enables the heat radiation to act directly and immediately on the thermal protection device. This enables improved thermal monitoring of the fuse with the thermal protection device. The insertion slot and the thermal protection device are preferably arranged in a common housing.

This may be a housing of a higher-level assembly group, for example, such as the housing of a travel adapter. However, it is also conceivable that a second, preferably separate housing, in which the insertion slot and the thermal fuse are arranged, is disposed inside said higher-level housing. Consequently, the influence of the heat radiation from the fuse, which is in the insertion slot in the use according to the invention, is increased on the thermal fuse.

In a preferred variant, the common housing, in which both the insertion slot and the thermal fuse are arranged, is sealed off from the environment.

Heat that is produced in a closed housing builds up and thus causes the thermal protection device to be actuated more quickly. The switching curve of the protection apparatus, otherwise expressed the tripping curve of the protection apparatus may be adapted or influenced accordingly by the corresponding design of a closed housing.

The common housing, in particular the housing embodied as the second housing, advantageously has a partition, wherein the insertion slot is arranged on a first side of the partition, and the thermal protection device is arranged on a second side of the partition. The partition makes it possible to separate the fuse physically from the thermal protection device while still allowing them to be arranged sufficiently close together to ensure that the heat development at the fuse acts directly on the thermal protection device.

The partition advantageously has a partition thickness, whereby a distance between the insertion slot on the first side and the thermal protection device on the second side can be defined by the thickness of the partition, thus creating a compact protection apparatus. The greater the partition thickness and therewith the greater the abovementioned distance is, the less influence the temperature radiated by the fuse has on the thermal protection device.

The insertion slot and the thermal protection device are advantageously arranged opposite one another on the partition, with the result that the common housing is compact and therefore economical in terms of space.

The partition advantageously divides the common, second housing into a first chamber and a second chamber. The insertion slot for a fuse is arranged in the first chamber and the thermal protection device is arranged in the second chamber. The insertion slot and the thermal fuse are thus spatially separated from one another so that, for example, destruction of the fuse in the insertion slot in the first chamber cannot have any mechanical effect on the thermal protection device in the second chamber.

The common, second housing is advantageously arranged in the travel adapter so as to be separable from the travel adapter. This then allows the common, second housing to be taken out of the travel adapter and at least the fuse to be arranged easily in the insertion slot, by clipping for example.

A further aspect of the present invention relates to a travel adapter comprising a protection apparatus as described herein.

This enables the provision of a travel adapter which is protected against both overcurrent and overheating and enables reliable operation of the travel adapter and/or apparatuses connected to it.

The travel adapter is preferably one which has at least one socket connector of a first standard and at least one pin connector of a second standard. The socket connector of the first standard has at least one first and one second contact socket. The plug of the second standard has at least one first and one second contact pin. One of the contact pins of the plug of the second standard is electrically connected or connectable to one of the contact sockets of the socket connector of the first standard by means of the protection apparatus.

In other words, an electrical circuit having a protection apparatus as described herein exists between one of the contact pins of the plug of the second standard and one of the contact sockets of the socket connector of the first standard. This circuit can have an open and a closed state, as described in the introduction.

In this context, it is conceivable that the remaining contact pin and the remaining contact socket are also connected to one another via an electrical circuit.

Such an arrangement provides a two-pole travel adapter that can be used in several countries with different electrical outlet standards and enables safe operation.

It may be provided that the socket connector of the first standard has a third contact socket for an earth pin and the plug of the second standard has a third contact pin as earth pin. The contact socket for the earth pin and the contact pin which is designed as an earth pin may also be connected to one another via an electrical circuit.

This enables the provision of a three-pin travel adapter which, depending on the selected standard of the socket and the plug, can be used in a large number of countries. The travel adapter preferably includes a fuse. In this way, a fully functional and ready-to-use travel adapter is provided.

In a preferred variant, the plug is mounted so as to be slidable or rotatable on the travel adapter. On the one hand, this renders it compact for transporting, and on the other hand the circuit can be disconnected. In addition, preparation may be made to provide several plugs conforming to various standards and to accommodate them in particular in displaceable or rotatable manner. This enables a corresponding country-specific plug to be extended out of the housing and the circuits contained in the travel adapter to be closed accordingly depending on the country in which the travel adapter is used.

Figure 2:
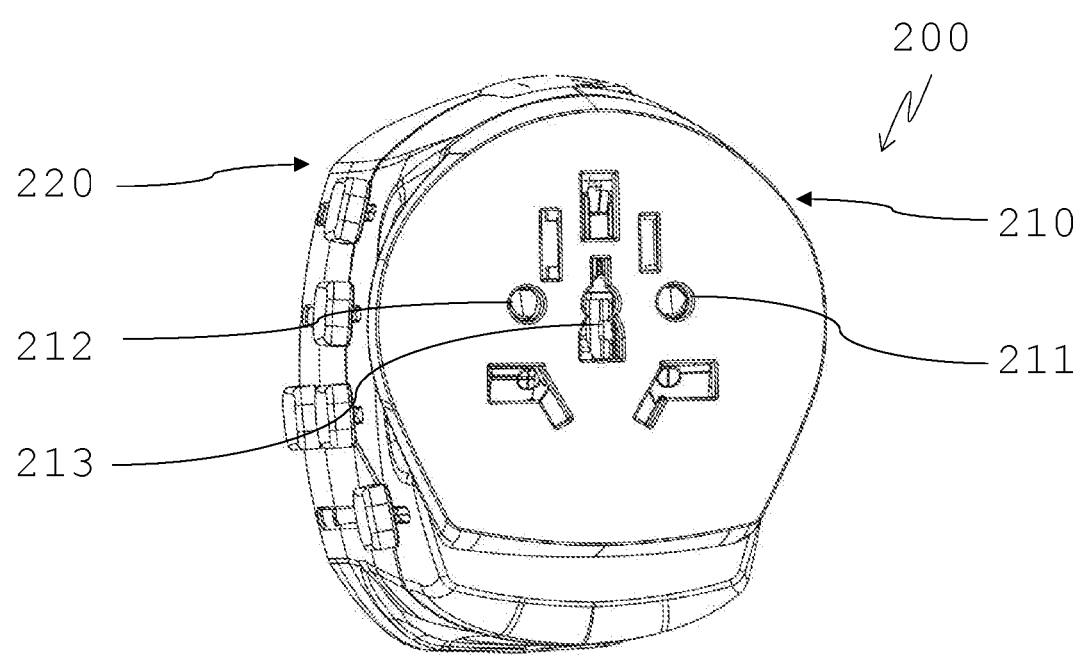
Figure 3:
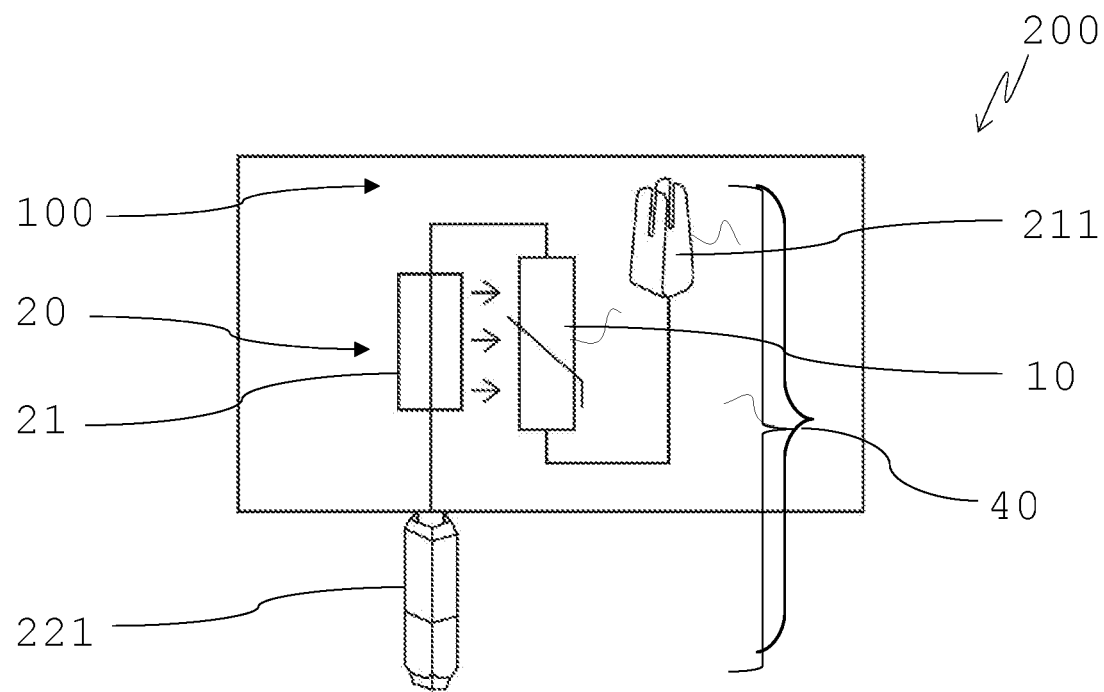
Figure 4:
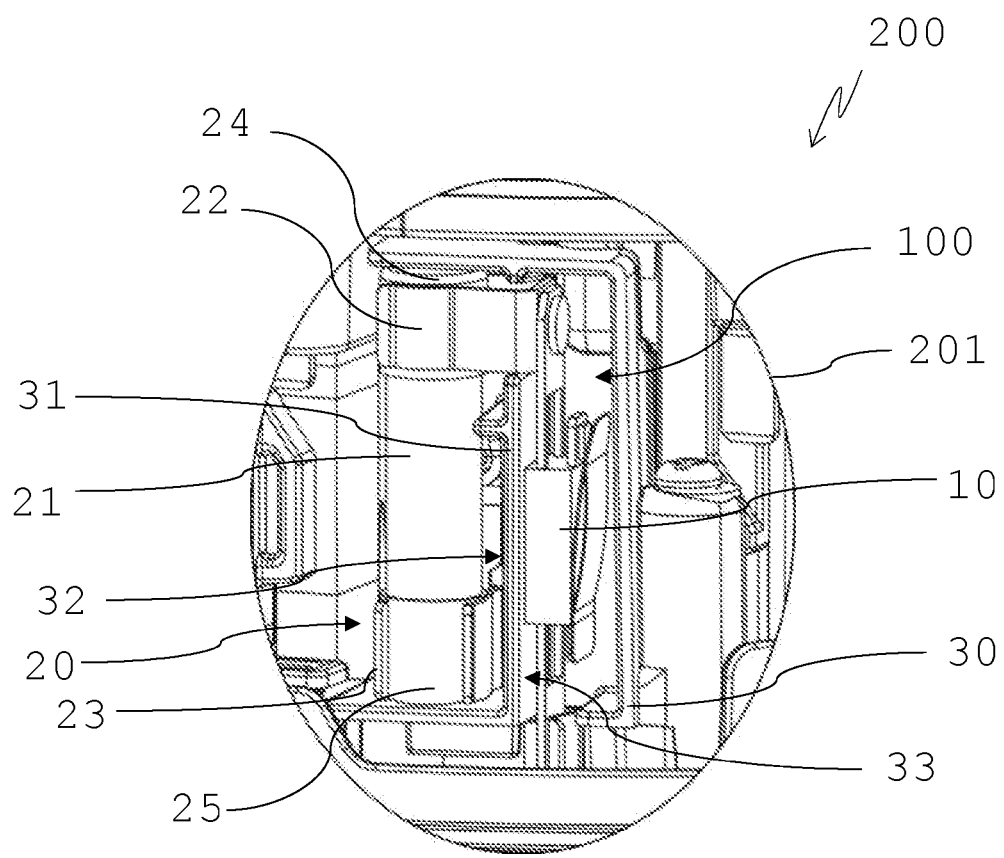

In the following text, the invention will be explained in greater detail with reference to figures which merely represent exemplary embodiments. The figures show:

FIG. 1 A perspective view of a travel adapter;

FIG. 2 A second perspective view of the travel adapter of FIG. 1;

FIG. 3 A schematic view of a protection apparatus;

FIG. 4 A detail view of the protection apparatus in a travel adapter.

FIG. 1 shows a perspective view of a travel adapter 200. The travel adapter 200 has a socket side 210 and a plug side 220. On the plug side 220, several plugs of a first standard are provided. The respective contact pins of the plugs of the first standard are each arranged behind associated openings inside a housing 201 of the travel adapter 200. For the sake of clarity, only the contact pins 221, 222, 223 of one standard are designated, in this case the US standard. FIG. 2 shows a perspective view of the travel adapter 200 of FIG. 1. The socket side 210 is visible in FIG. 2. The socket side 210 also has a plurality of openings, in which contact elements are arranged for receiving contact pins of a plug. The openings together with the contact elements represent contact sockets. For the sake of clarity, only the contact sockets of one standard are provided with reference numerals, in this case the contact sockets 211, 212, and 213 of the Italian standard.

FIG. 3 is a schematic view of a protection apparatus 100. The protection apparatus 100 is represented schematically in a travel adapter 200. In the present case the protection apparatus 100 is disposed between a contact socket 211 and a contact pin 221. In this case, the connection between the contact socket 211 and the contact pin 221 forms a circuit 40. A thermal protection device 10 and an insertion slot 20 for a fuse 21 are arranged within the circuit 40. In the present case, the insertion slot 20 is arranged adjacently to the thermal protection device 10. The radiation of the heat from the fuse 21 towards the thermal protection device 10 is shown by arrows.

FIG. 4 shows a detailed view from side X of FIG. 1 of the protection apparatus 100 in a travel adapter 200. The housing 201 of the travel adapter 200 is represented as being transparent, so that the protection apparatus 100 is visible inside the housing 201. The protection apparatus 100 is located in a second housing 30 inside the housing 201, which means that in other words it represents a common housing for the insertion slot 20 and the thermal protection device 10. The second housing 30 can be detached and thus separated spatially from the housing 201. The second housing 30 has two chambers 34, 35, which are not shown in greater detail, wherein one chamber 34 has the form of an insertion slot 20 in which a fuse 21 is arranged. The second chamber 35, in which the thermal protection device 10 is arranged, extends parallel to the insertion slot 20. The second chamber 35, in which the thermal protection device 10 is arranged, is separated from the insertion slot 20 by a partition 31, the insertion slot 20 being arranged on a first side 32 of the partition 31 and the thermal protection device 10 being arranged on a second side 33 of the partition 31. This arrangement makes it possible to physically separate the fuse 21 from the thermal protection device 10 but still position them sufficiently close together to ensure that the heat development at the fuse 21 acts directly on the thermal protection device 10. The fuse 21 may be arranged detachably or separably on the insertion slot 20. The insertion slot 20 has a first contact clip 22 and a second contact clip 23, which hold the fuse 21 against a first contact 24 and a second contact 25, and whereby the first contact clip 22 is connected to the second contact clip 23. Like the technical content of the claims and figures, the list of reference numerals is part of the disclosure. The same reference numerals denote identical components, reference numerals with different indices indicate functionally equivalent or similar components.

LIST OF REFERENCE NUMERALS

100 Protection apparatus
200 Travel adapter
201 Housing
210 Socket side
211 Contact socket
212 Contact socket
213 Contact socket
220 Plug side
221 Contact pin
222 Contact pin
223 Contact pin
10 Thermal protection device
20 Insertion slot
21 Fuse
22 First contact clip
23 Second contact clip
24 First contact of 21
25 Second contact of 21
30 Second housing
31 Partition
32 First side of 31
33 Second side of 31
40 Circuit

The invention claimed is:

1. A protection apparatus for protecting an electrical circuit of a travel adapter, comprising: a thermal protection device for interrupting the electrical circuit of the travel adapter at a certain temperature; and an insertion slot for receiving a fuse suitable for interrupting the electrical circuit at a certain current intensity in the electrical circuit, the thermal protection device and the insertion slot connected in series in the electrical circuit, wherein the insertion slot and the thermal protection device are arranged adjacently; wherein the travel adapter has at least one socket of a first standard and at least one plug of a second standard, the socket of the first standard having at least one first and a second contact sockets and the at least one plug of the second standard having at least one first and second contact pins; and wherein one of the at least one first and a second contact pins of the at least one plug of the second standard and one of the at least one contact sockets of the socket of the first standard are electrically connected or connectable to each other via the series connection of the insertion slot and the thermal protection device.

2. The protection apparatus according to claim 1, wherein the thermal protection device is resettable.

3. The protection apparatus according to claim 2, wherein the thermal protection device comprises an automatic reset.

4. The protection apparatus according to claim 2, wherein the thermal protection device comprises a manual reset.

5. The protection apparatus of claim 1, wherein the insertion slot and the thermal protection device are arranged substantially parallel to one another.

6. The protection apparatus of claim 1, wherein the insertion slot and the thermal protection device are arranged in a common housing, wherein the common housing has a partition, wherein the insertion slot is arranged on a first side of the partition and the thermal protection device is arranged on a second side of the partition.

7. A travel adapter comprising: an electrical circuit; a thermal protection apparatus configured to interrupt the electrical circuit at a certain temperature; and an insertion slot configured to receive a fuse suitable for interrupting the electrical circuit at a certain current intensity in the electrical circuit, the thermal protection apparatus and the insertion slot connected in series in the electrical circuit, wherein the insertion slot and the thermal protection device are arranged adjacently, wherein the travel adapter has at least one socket of a first standard and at least one plug of a second standard, the socket of the first standard having at least one first and a second contact sockets and the at least one plug of the second standard having at least one first and second contact pins; and wherein one of the at least one first and a second contact pins of the at least one plug of the second standard and one of the at least one contact sockets of the socket of the first standard are electrically connected or connectable to each other via the series connection in series of the insertion slot and the thermal protection apparatus.

8. Travel adapter according to claim 7, wherein the at least one socket of the first standard has a third contact socket for an earth pin and the at least one plug of the second standard has a third contact pin comprising an earth pin.

9. Travel adapter according to claim 7, further comprising a fuse.

* * * * *